United States Patent
Ueda

(10) Patent No.: US 9,557,730 B2
(45) Date of Patent: Jan. 31, 2017

(54) DRIVING APPARATUS AND ARTICLE PROCESSING APPARATUS

(71) Applicant: CANON KABUSHIKI KAISHA, Tokyo (JP)

(72) Inventor: Shinji Ueda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 14/574,313

(22) Filed: Dec. 17, 2014

(65) Prior Publication Data

US 2015/0192905 A1 Jul. 9, 2015

(30) Foreign Application Priority Data

Jan. 7, 2014 (JP) ................. 2014-000767

(51) Int. Cl.
*G05B 6/02* (2006.01)
*G05B 19/19* (2006.01)

(52) U.S. Cl.
CPC ..... *G05B 19/19* (2013.01); *G05B 2219/37344* (2013.01); *G05B 2219/41331* (2013.01); *G05B 2219/45165* (2013.01)

(58) Field of Classification Search
CPC ........................................................ G05B 6/02
USPC ................. 318/556, 555, 552, 543
See application file for complete search history.

(56) References Cited

U.S. PATENT DOCUMENTS

| | | | | |
|---|---|---|---|---|
| 4,694,390 A | * | 9/1987 | Lee | G05B 19/358 137/487.5 |
| 4,816,987 A | * | 3/1989 | Brooks | F16K 31/046 137/487.5 |
| 5,490,287 A | | 2/1996 | Itoh et al. | |
| 5,742,742 A | | 4/1998 | Ueda | |
| 5,818,651 A | * | 10/1998 | Nomura | G11B 21/083 360/75 |
| 5,918,202 A | | 6/1999 | Kuroki et al. | |
| 8,084,979 B2 | * | 12/2011 | Sten-Halvorsen | G01R 31/343 318/469 |

FOREIGN PATENT DOCUMENTS

JP    09-229713 A    9/1997

* cited by examiner

*Primary Examiner* — David S Luo
(74) *Attorney, Agent, or Firm* — Fitzpatrick, Cella, Harper & Scinto

(57) ABSTRACT

Provided is a driving apparatus for driving an object. The driving apparatus includes a driving device configured to displace the object; a detector configured to detect a displacement amount of the object by the driving device; and a controller configured to control the driving device based on an output of the detector. The controller is configured to obtain a thrust characteristic of the driving device with respect to the displacement amount and to set a reference with respect to the displacement amount based on the obtained thrust characteristic.

10 Claims, 5 Drawing Sheets

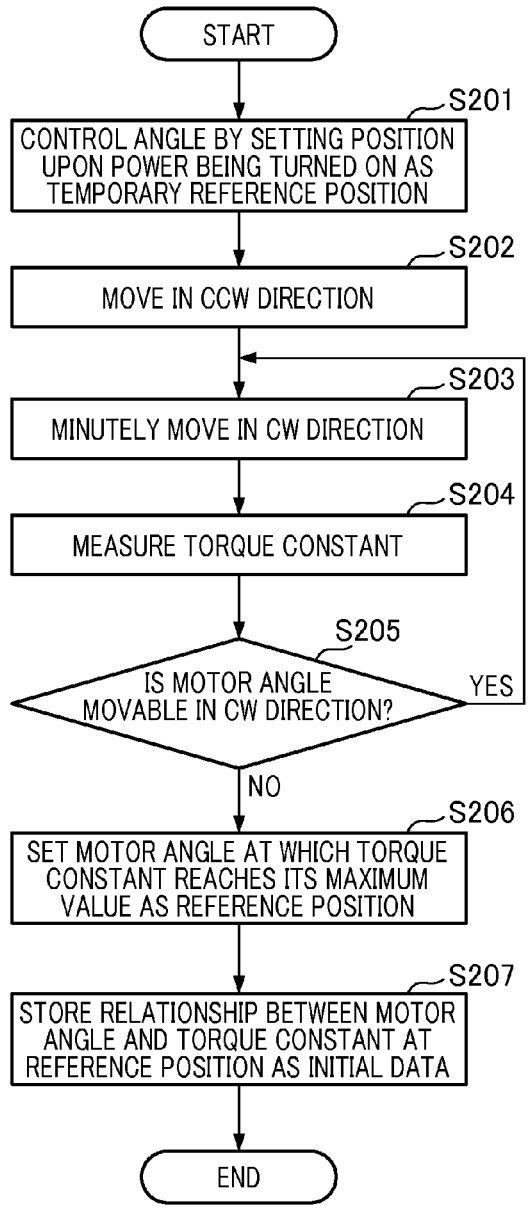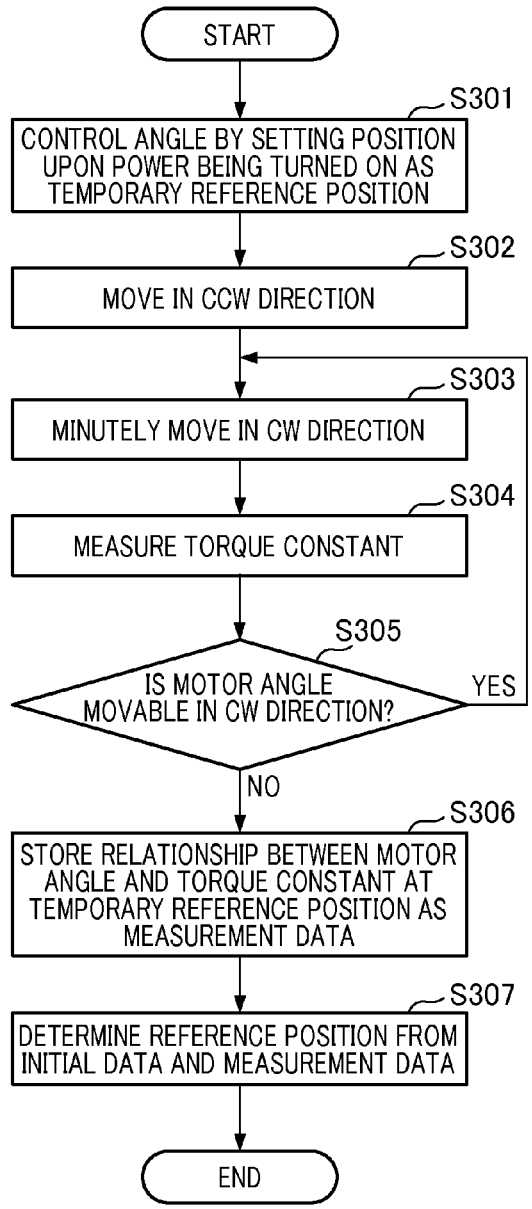

DRIVING APPARATUS AND ARTICLE PROCESSING APPARATUS

BACKGROUND OF THE INVENTION

Field of the Invention

The present invention relates to a driving apparatus and an article processing apparatus.

Description of the Related Art

For example, a galvano motor or a linear motor is used in an article processing apparatus such as a laser processing apparatus, a semiconductor manufacturing apparatus, or the like. Among them, the galvano scanner performs positioning of, with high precision, a mirror attached to a shaft of a rotary motor (galvano motor), and then a laser beam which is reflected by the mirror. As a detector that detects a rotation angle for highly accurate positioning, an electrostatic capacitance sensor, an optical encoder, or a magnetic encoder is used. On the other hand, the linear motor performs positioning for an object to be processed such as a wafer, a mask, or the like with high accuracy. Furthermore, there are an absolute type and an incremental type for encoders. Among them, the incremental-type encoder (hereinafter referred to as "incremental encoder") may detect the displacement amount of an object to be processed from an increase/decrease in pulse with respect to the displacement of a scale. However, in the incremental encoder, a sensor for detecting a reference position (zero point) is separately required for specifying an absolute position. Accordingly, Japanese Patent Laid-Open No. H9-229713 discloses an incremental encoder that outputs the phase Z signal indicating a reference position in addition to the phase A and phase B signals indicating a relative position. In the electrostatic capacitance sensor, the reproducibility of a detection position is affected by an environmental condition such as temperature or humidity. In order to correct a measurement value affected thereby, a sensor for detecting a reference position may be separately required.

In the driving apparatus including the incremental encoder disclosed in Japanese Patent Laid-Open No. H9-229713, a sensor for detecting a reference position needs to be separately provided as described above, and thus, there is room for further improvement in size and cost thereof.

SUMMARY OF THE INVENTION

The present invention provides, for example, a driving apparatus advantageous in terms of setting of a reference with respect to an displacement amount thereby.

According to an aspect of the present invention, a driving apparatus for driving an object is provided that includes a driving device configured to displace the object; a detector configured to detect a displacement amount of the object by the driving device; and a controller configured to control the driving device based on an output of the detector, wherein the controller is configured to obtain a thrust characteristic of the driving device with respect to the displacement amount and to set a reference with respect to the displacement amount based on the obtained thrust characteristic.

Further features of the present invention will become apparent from the following description of exemplary embodiments (with reference to the attached drawings).

BRIEF DESCRIPTION OF THE DRAWINGS

FIGS. 6A and 6B are flowcharts illustrating a reference position detecting step according to a third embodiment.

DESCRIPTION OF THE EMBODIMENTS

Hereinafter, preferred embodiments of the present invention will be described with reference to the drawings.

First Embodiment

Figure 1:
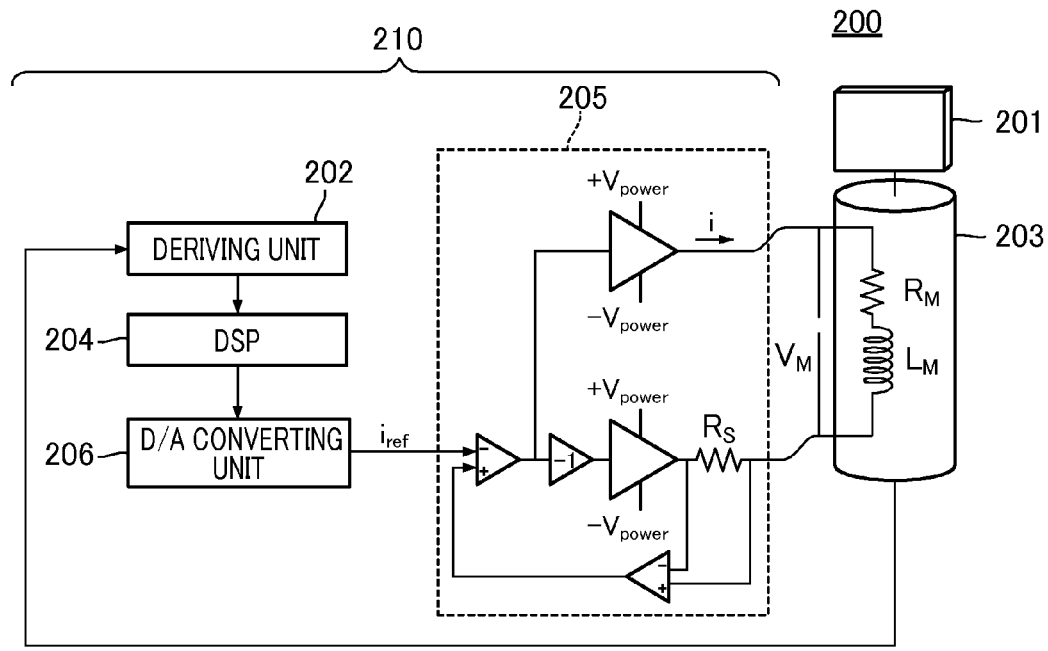
FIG. 1 illustrates a configuration of a galvano scanner according to a first embodiment of the present invention.

Firstly, a description will be given of a driving apparatus according to a first embodiment of the present invention. It is assumed that the driving apparatus according to the present embodiment is an optical scanning mechanism called "galvano scanner" that scans light with high accuracy using a rotary motor (adjusts a light reflecting position). FIG. 1 illustrates a configuration of a galvano scanner 200 according to the present embodiment. The galvano scanner 200 includes a galvano motor 100 that serves as a driving device including a mirror 201 and a motor 203 as the objects for rotation (displacement) and a controller 210 that controls the operation of the galvano motor 100.

Figure 2:
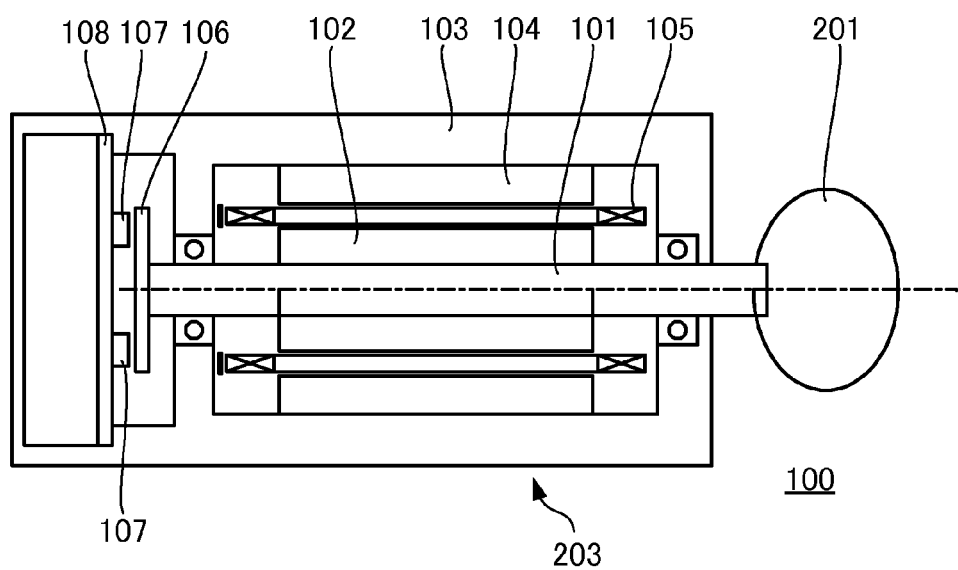
FIG. 2 is a schematic cross-sectional view illustrating a configuration of the galvano motor according to the first embodiment.

FIG. 2 is a schematic cross-sectional view illustrating a configuration of the galvano motor 100. The mirror 201 is a so-called "galvano mirror" that is directly connected to one end of a motor shaft 101 which is the rotational shaft of the motor 203 to reflect, for example, a laser beam. A magnet (a mover, in this case, a rotator) 102 is fixed at a substantially central portion of the motor shaft 101 and is divided into four in the circumferential direction. It should be noted that the mirror 201 is connected continuously to the magnet 102 via the motor shaft 101 and the position (rotation angle) of the magnet 102 means the same as the position (rotation angle) of the mirror 201 in the present embodiment. Hereinafter, the "motor angle" (the rotation angle of the motor 203) is uniquely defined for ease of understanding. A fixed yoke 104 is fixed to a motor case 103 and forms a magnetic circuit in cooperation with the magnet 102. A coil (stator) 105 is fixed to the fixed yoke 104 to rotationally drive the magnet 102 and the motor shaft 101 and is divided into four in the circumferential direction. A relative positional relationship between the magnet 102 and the coil 105 generates a Lorentz force on a current (motor driving current) flowing through the coil 105 so that a rotary torque can be obtained. A scale (encoder scale) 106 is a plate that is fixed to the other end of the motor shaft 101 and has a grid for obtaining angle information (position information). The sensor 107 detects a grid on the scale 106. In the present embodiment, the scale 106 and the sensor 107 constitute an incremental-type rotary encoder serving as a detector. A substrate 108 incorporates the sensor 107, converts an output signal from the sensor 107 into a digital signal, and transmits the digital signal to a deriving unit 202 shown in FIG. 1. In FIG. 1, the coil resistance of the motor 203 is denoted by $R_M$, the coil inductance is denoted by $L_M$, and the applied voltage to the motor 203 is denoted by $V_M$.

The controller 210 executes driving control of the motor 203, computation for determining a reference position for specifying an absolute position in the present embodiment, and the like. In particular, the controller 210 includes a deriving unit 202, a DSP 204, a D/A converting unit 206, and a current amplifier 205. The deriving unit 202 derives a motor angle (displacement amount) as angle information of the motor 203 based on an output signal from the sensor 107 provided in the motor 203. The DSP 204 executes a feedback control computation to thereby output an electrical current command value to the D/A converting unit 206. The current amplifier 205 is a bridge drive linear amplifier that provides feedback by detecting a motor driving current by the resistance $R_S$ to adjust the applied voltage $V_M$ such that an electrical current command value obtained from the D/A converting unit 206 becomes equal to a motor driving current.

Figure 3:
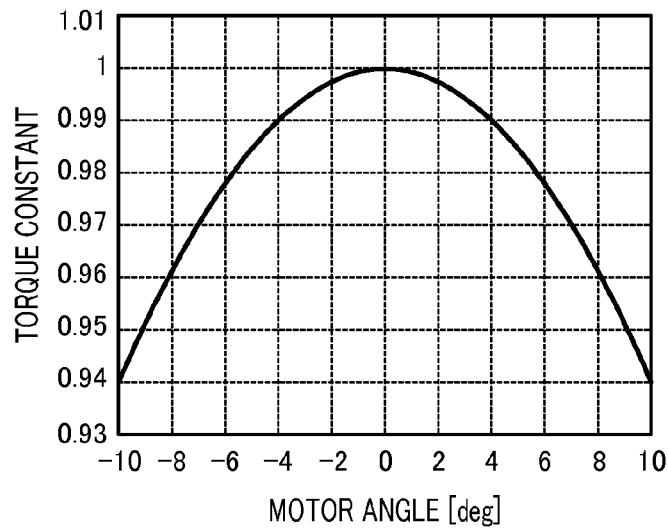
FIG. 3 is a graph illustrating torque constant versus motor angle according to the first embodiment.

FIG. 3 is a graph illustrating torque constant (thrust constant) versus motor angle as a thrust characteristic. In the present embodiment, the galvano motor 100 is designed such that the torque constant is maximized at the reference position as shown in FIG. 3 so as to be cos 2θ times with respect to the motor angle θ (rad). In FIG. 3, the torque constant value is normalized such that the maximum value thereof is displayed as 1. In the present embodiment, the motor angle at which the torque constant becomes a maximum value is found to define the position as a reference position. Hereinafter, a detailed description will be given of a method for detecting (setting) the reference position.

Figure 4:
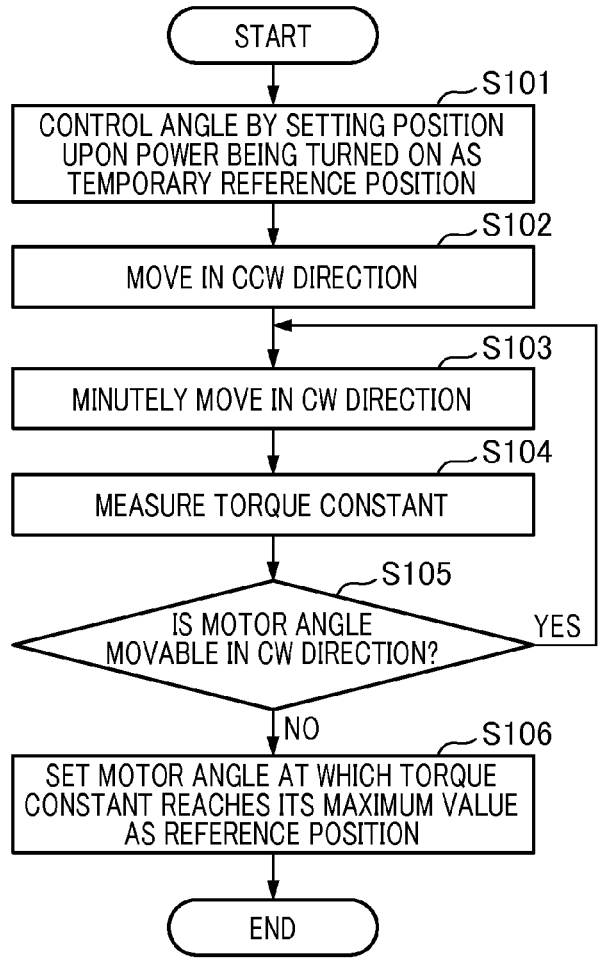
FIG. 4 is a flowchart illustrating a reference position detecting step according to the first embodiment.

FIG. 4 is a flowchart illustrating a reference position detecting step in the galvano scanner 200. The incremental encoder cannot measure the absolute angle of the motor upon the power being turned on, so that the absolute angle of the motor cannot be found until the reference position is detected after the power is turned on. Thus, the controller 210 firstly sets the motor angle upon the power being turned on as a temporary reference position and executes angle control (position control) of the motor 203 to the reference position (step S101). Next, the controller 210 maximally moves the motor angle in the CCW direction (step S102). The galvano motor 100 is provided with a mechanical stopper (not shown) such that the motor angle is only movable within the driving range of about ±10 degrees about the reference position. Thus, the controller 210 may move the motor angle until the motor abuts against one end of the mechanical stopper (one end of the driving range). Next, the controller 210 step wisely moves the motor angle by a minute angle in the CW direction (step S103). Next, the controller 210 measures a torque constant while maintaining the motor angle in this state (step S104).

Here, as a method for measuring a torque constant, there is a method for measuring a positional response for an electrical current command value by superimposingly applying a sine wave having a predetermined amplitude to an electrical current command value for the motor 203. Given that the torque constant of the motor 203 is denoted by Kt (Nm/A) and the motor driving current is denoted by i (A), the driving torque T is represented by T=Kt×i. Given that the motor inertia is denoted by J (kg·m$^2$) and the angular acceleration is denoted by a (rad/s$^2$), the driving torque T is represented by T=J×a. Thus, the torque constant Kt is represented by Kt=J×a/i from these equations, and thus, the controller 210 can measure (specify) the torque constant Kt from the equation. Here, the inertia J is already known and the motor driving current i and the angular acceleration a can be readily determined by the DSP 204. If the inertia J is not known but has a substantially constant value, a value proportional to the torque constant Kt may also be determined for use.

Next, the controller 210 determines whether or not the motor angle can be moved in the CW direction (step S105). Here, if the controller 210 determines that the motor angle can be moved in the CW direction (Yes in step S105), the processing returns to step S103, and micro movement in the CW direction is repeated. On the other hand, if the controller 210 determines that the motor angle cannot be moved in the CW direction, that is, if the controller 210 determines that the motor angle has moved to the rotation limit on the opposite side from that toward which the motor angle has maximally moved in step S102 (the position of the stopper at the other end of the driving range) (No in step S105), the processing shifts to the next step S106. Then, the controller 210 specifies a motor angle under a predetermined condition where the torque constant reaches its maximum value (extremum) from data of the torque constant versus the motor angle obtained by repetition from step 103 to step S105, and then set the motor angle as the reference position (step S106).

As described above, even when the incremental encoder is used in the galvano motor 100, the galvano scanner 200 can detect the reference position for specifying the absolute position without separately providing a conventionally required dedicated sensor. Thus, the configuration of the galvano motor 100 can be simplified, resulting in a reduction in cost of the galvano motor 100 and the galvano scanner 200 using the same.

Detecting the reference position by the above method has an advantage that no sensor for detecting a reference position is needed and the configuration of the incremental encoder itself for detecting the motor angle θ can be simplified. In other words, a reference mark to be detected by a sensor for detecting a reference position is conventionally provided on a scale. In contrast, in the present embodiment, no sensor for detecting a reference position is needed and no reference mark corresponding to the reference position on the scale 106 is also needed.

Figure 5A:
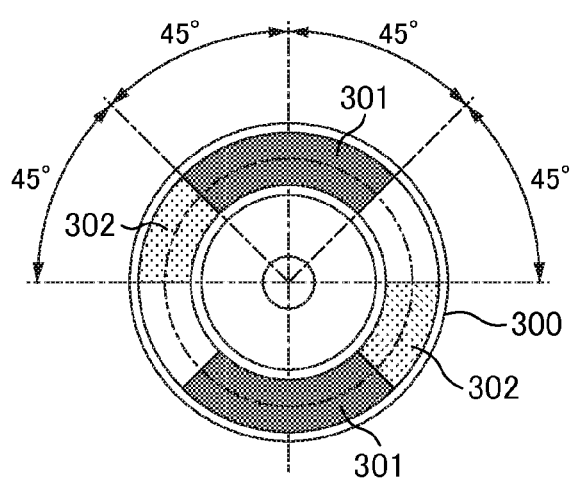
FIG. 5A illustrates the shape of a conventional encoder scale.
Figure 5B:
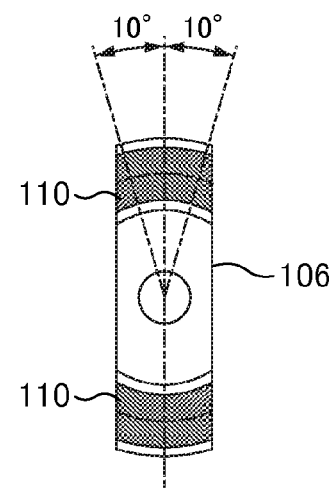
FIG. 5B illustrates the shape of an encoder scale according to the first embodiment.

FIGS. 5A and 5B are schematic plan views illustrating the shapes of the scale of the present embodiment and the conventional scale for comparison. Firstly, FIG. 5A illustrates the shape of a scale 300 in the conventional case where a sensor for detecting a reference position is needed. The scale 300 has a grid pattern 301 for obtaining the phase A and phase B signals of the incremental encoder and a reference mark 302 for detecting the reference position. In particular, the reference mark 302 is provided at an angle position different from the grid pattern 301 as shown in FIG. 5A for the sake of the arrangement of optical components such as a light emitting element, a light receiving element, and the like and electric components. As described above, in the conventional incremental encoder, the planar shape of the scale is typically a circle in order to provide the reference mark 302 on the scale. In contrast, FIG. 5B illustrates the shape of a scale 106 in the case of the present embodiment where no sensor for detecting a reference position is needed. A reference mark as described above is not needed on the scale 106 and a grid pattern 110 for obtaining the phase A and phase B signals by the sensor 107 may be present within the range of about ±10 degrees about the reference position. Thus, the shape of the scale 106 is a substantial rectangular as shown in FIG. 5B, so that the shape of the scale 106 can be made small as compared with a conventional case. This allows not only to reduce a cost of producing the scale 106 but also to reduce the scale inertia, resulting in an improvement in the dynamic behavior of a mechanical system.

As described above, according to the present embodiment, a driving apparatus that is advantageous for setting a reference position may be provided.

Second Embodiment

Next, a description will be given of a driving apparatus according to a second embodiment of the present invention. In the first embodiment, a description has been given that the galvano motor 100 is designed such that the torque constant is maximized at the reference position so as to be cos 2θ times with respect to the motor angle θ. In this case, a change in torque constant near the reference position is small. Thus, in order to detect the reference position more accurately by the galvano scanner 200 according to the first embodiment, it is preferable that the measurement error of the torque constant is suppressed as much as possible depending on the detection accuracy. Hence, in the present embodiment, a description will be given of the case where the reference position of the galvano scanner 200 described in the first embodiment is not determined at a motor angle at which the torque constant reaches its maximum value.

The torque constant varies depending on the motor angle as shown in FIG. 3 but is cos 2θ times with respect to the motor angle θ, and thus, it can be expected that the torque constant at a position where the motor angle is −5 degrees is the same as that at a position where the motor angle is +5 degrees. Thus, the controller 210 firstly measures the torque constant with respect to the motor angle by the same procedure as that of the first embodiment. Here, since the torque constant is decreased by 1.6% from the maximum value thereof at positions where the motor angles are −5 degrees and +5 degrees, the controller 210 determines two points of motor angles at which the torque constant is decreased by 1.6% from the maximum value thereof using the measurement results of the torque constant. Next, the controller 210 selects one of the two points in the CW direction from the motor angle at which the torque constant reaches its maximum value and selects the other one in the CCW direction. Then, the controller 210 determines the center of two points of the motor angles as the reference position. According to the present embodiment, the reference position is detected by using a region where the change in the torque constant with respect to the motor angle is steep, i.e., the slope of the parabola shown in FIG. 3, measurement error of the torque constant can be suppressed as much as possible.

Third Embodiment

Next, a description will be given of a driving apparatus according to a third embodiment of the present invention. In the first embodiment, the reference position is determined only at a position where the torque constant reaches its maximum value, whereas in the second embodiment, the reference position is determined with focusing on two points of motor angles at which the torque constant is decreased by 1.6% from the maximum value thereof. In contrast, a further increase in measurement accuracy can be expected if data of the torque constant measured at many motor angles is used. Accordingly, in the present embodiment, among measurement data of the torque constant versus the motor angle, a description will be given of the case where more measurement data than those in the above embodiments is used.

FIGS. 6A and 6B are flowcharts each illustrating a reference position detecting step in the galvano scanner in the present embodiment. Since the configuration of the galvano scanner itself is the same as that of the galvano scanner 200 according to the first embodiment, the components corresponding to those in the first embodiment are designated by the same reference numerals, and explanation thereof will be omitted. The reference position detecting step in the present embodiment includes two steps: an initialization process (flow) shown in FIG. 6A and a use process (flow) shown in FIG. 6B. Among them, the initialization process (flow) is included in a step in the process of manufacturing the galvano scanner 200 (e.g., an inspection step prior to shipping the product). On the other hand, the use process (flow) is included in a step upon running the galvano scanner 200 for actual use by the user.

Figure 7:
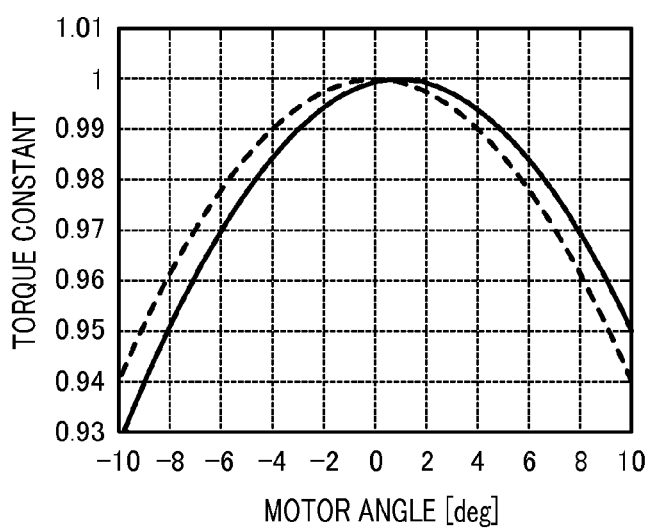
FIG. 7 is a graph illustrating torque constant versus motor angle according to the third embodiment.

Firstly, a description will be given of the initialization process (flow) with reference to FIG. 6A. In the initialization process (flow), the controller 210 defines a reference position, and stores a measurement data of the torque constant versus the motor angle upon determining a reference position as an initial data. Firstly, the processes from step S201 to step S206 respectively correspond to the processes from step S101 to S106 in the reference position detecting step described with reference to FIG. 4 in the first embodiment. Then, the controller 210 stores the relationship between the motor angle and the torque constant at the reference position detected (specified) in the processes from step S201 to step S206 as the initial data (initial value) (step S207). FIG. 7 is a graph illustrating torque constant versus motor angle in this case. The relationship between the motor angle and the torque constant at the reference position, which serves as initial data, is shown by a broken line in FIG. 7 as an example. Here, the torque constant measured at the motor angle p is represented by Kt(p) {p=−10, −9, ..., 9, 10} based on the assumption that the torque constant is measured at one-degree angular increment of the motor angle from −10 degrees to +10 degrees.

Next, a description will be given of the use process (flow) with reference to FIG. 6B. In the use process (flow), the controller 210 compares a measurement data of the torque constant versus the motor angle with the initial data stored in the initialization process (flow) to thereby detect a reference position. The processes from step S301 to step S305 respectively correspond to the processes from step S101 to S105 in the reference position detecting step described with reference to FIG. 4 in the first embodiment. Then, the controller 210 stores the relationship between the motor angle and the torque constant at the temporary reference position as the measurement data (step S306). The relationship between the motor angle and the torque constant at the temporary reference position is shown by a solid line in FIG. 7 as an example. Here, the torque constant measured at the motor angle p is represented by Kt'(p) {p=−10, −9, ..., 9, 10} based on the assumption that the torque constant is measured at one-degree angular increment of the motor angle from −10 degrees to +10 degrees. Then, the controller 210 determines the reference position of measurement data such that the initial data (the broken line) and the measurement data (the solid line) shown in FIG. 7 substantially coincide (match) with each other (step S307). In the example shown in FIG. 7, it can be seen that two data match if a temporary reference position is shifted by −1 degree. As a method for matching two data, the use of the method of least squares is contemplated. In this case, the controller 210 determines the sum J(k) of squares of each error between the eleven initial data and the measurement data shifted from the temporary reference position by k degrees as a degree of correlation from the following Formula (1). Then, the controller 210 can satisfy a predetermined condition, that is, can determine the reference position by determining k at which J(k) is minimized.

[Formula 1]

$$J(k) = \sum_{p=-5}^{5} (k_t(p) - k'_t(p-k))^2 \qquad (1)$$

According to the present embodiment, data of the torque constant measured at many motor angles is used as compared with the case of the above embodiments, resulting in a further increase in measurement accuracy. As another method for matching the above data, the method using a coefficient of correlation between the eleven initial data and the measurement data shifted from the temporary reference position by k degrees is used. The torque constant may be affected by ambient temperature. This is caused by thermal demagnetization of the magnet 102 used in the motor 203. Accordingly, the torque constant of the initial data and the measurement data may also be normalized in order to suppress an adverse effect caused by thermal demagnetization.

Fourth Embodiment

Next, a description will be given of a driving apparatus according to a fourth embodiment of the present invention. In the above embodiments, a description has been given of the case where the galvano motor 100 is designed such that the torque constant is cos 2θ times with respect to the motor angle θ and the number of times an increase or decrease in the torque constant relative to the motor angle is only one, i.e., there is only one wave in the graph shown in FIG. 3. The present invention is not limited thereto but is also applicable to the case where the number of times an increase or decrease in the torque constant relative to the motor angle is in plural. Hereinafter, in the present embodiment, a description will be given of detection of a reference position in this case based on the assumption that the galvano motor has the torque constant $kt(θ)$ which is (1+0.01 cos 2θ+0.1 cos 200θ) times. Since the configuration of the galvano scanner itself is the same as that of the galvano scanner 200 according to the first embodiment, the components corresponding to those in the first embodiment are designated by the same reference numerals, and explanation thereof will be omitted. As in the first embodiment, the galvano motor 100 of the present embodiment is only movable within the range of about ±10 degrees about the reference position.

The torque constant largely changes with a cycle of the motor angle π/100 (rad) by the term of cos 200θ. Hence, the controller 210 measures and determines the relationship between the motor angle and the torque constant with angular resolution which is sufficiently small relative to π/100 (rad). At this time, when a square error is determined as in the procedure of the third embodiment using the relationship between the motor angle and the torque constant, the square error becomes small with a cycle of π/100 (rad). On the other hand, the square error has a minimum value for each π (rad) by the term of 0.01 cos 2θ. Thus, even when the peak of the torque constant is output in plural as described above, it can be seen that the reference position can be determined as in the first embodiment.

In general, even when the motor is designed such that the torque constant becomes constant regardless of the motor angle, the motor actually has a torque ripple depending on a motor angle with respect to a design value due to the magnetic flux density of magnets and the manufactured variation in size of coils. Thus, the method for determining a reference position according to the present embodiment is also applicable to a motor designed such that the torque constant becomes constant. The method is not only applicable to the above example but also is applicable to a motor in which the torque constant kt(θ) is (2+0.1 cos 200θ) times with respect to the motor angle θ(rad) because it is contemplated that such a motor also has a torque ripple depending on a motor angle.

According to the present embodiment, the reference position can be determined as in the first embodiment even when the number of times an increase or decrease in the torque constant relative to the motor angle is in plural.

Other Embodiment

Note that the reference position may be synchronized with the motor angle at which the phase A or phase B signal of the incremental encoder rises in order to increase the reproducibility of the reference position. This is because of good positional reproducibility of the phase A or phase B signal. In this case, the motor angle, at which the phase A or phase B signal rises, closest to the reference position detected by the procedure described in the above embodiments may be set as the reference position. The motor angle itself at which the phase A or phase B signal falls may also be set as the reference position. While, in the above embodiments, a description has been given of the case where the motor 203 serving as a rotary motor is employed, the present invention is also applicable to the case where a linear motor is employed. Furthermore, while, in the above embodiments, a description has been given of the case where an incremental encoder is employed as a detector (position detector), the present invention is also applicable to the case where an electrostatic capacitance sensor is employed.

(Article Processing Apparatus)

Figure 8:
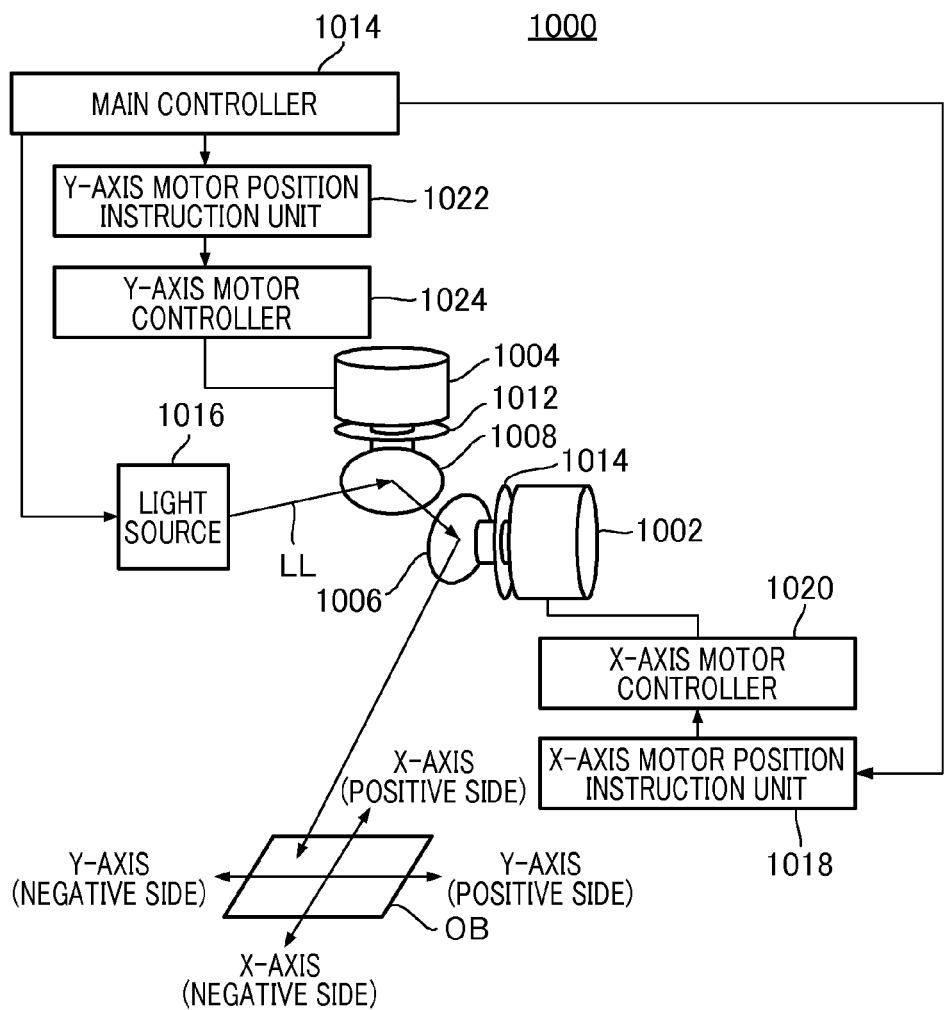
FIG. 8 illustrates a configuration of a laser processing apparatus according to one embodiment.

Next, a description will be given of an article processing apparatus according to one embodiment of the present invention. The article processing apparatus used therein is an industrial apparatus including the driving apparatus described in the above embodiments, such as a laser processing apparatus, a laser measurement apparatus, or the like. In the present embodiment, a description will be given by taking an example in which the article processing apparatus is a laser processing apparatus. FIG. 8 illustrates a configuration of a laser processing apparatus 1000. The laser processing apparatus 1000 irradiates an object to be processed (irradiation object) OB with a laser beam LL to perform processing such as cutting, drilling, welding, or the like of the object OB.

The laser processing apparatus 1000 includes an X-axis motor 1002, a Y-axis motor 1004, a light source 1016, and a main controller 1014. The X-axis motor 1002 rotates an X-axis mirror 1006 attached to the rotational shaft thereof to move the X-axis mirror 1006 from the first position and to stop it at the second position. Likewise, the Y-axis motor 1004 rotates a Y-axis mirror 1008 attached to the rotational shaft thereof to move the Y-axis mirror 1008 from the first position and to stop it at the second position. An X-axis detector 1010 is constituted by an incremental-type rotary encoder to detect the rotation angle (i.e., the rotation angle of the rotational shaft of the X-axis motor 1002) of the X-axis mirror 1006. Likewise, a Y-axis detector 1012 is constituted by an incremental-type rotary encoder to detect the rotation angle (i.e., the rotation angle of the rotational shaft of the Y-axis motor 1004) of the Y-axis mirror 1008. The light source 1016 illuminates the laser beam LL. The main controller 1014 executes an operation control of driving systems of the laser processing apparatus 1000 and various types of computation to output the "ON" signal for instructing illumination (emission) of the laser beam LL and the "OFF" signal for instructing non-illumination (non-emission) of the laser beam LL to the light source 1016. The main controller 1014 also instructs an X-axis motor position instruction unit 1018 and a Y-axis motor position instruction unit 1022 about the X-coordinate position and the Y-coordinate position on the working surface. The X-axis motor position instruction unit 1018 and the Y-axis motor position instruction unit 1022 calculate the rotation angles to be instructed to the motors 1002 and 1004 from the given coordinate positions and then instruct an X-axis motor controller 1020 and a Y-axis motor controller 1024, respectively.

Here, the motor 203 of the above embodiment is applied to the X-axis motor 1002 and the Y-axis motor 1004. The X-axis mirror 1006 and the Y-axis mirror 1008 correspond to the mirror 201 and the X-axis detector 1010 and the Y-axis detector 1012 correspond to the sensor 107 according to the above embodiment. The X-axis motor controller 1020 and the Y-axis motor controller 1024 correspond to the controller 210 according to the above embodiment. The X-axis motor controller 1020 calculates feedback control using the DSP provided therein based on the rotation angle of the X-axis mirror 1006 detected by the X-axis detector 1010 to control driving of the X-axis motor 1002. Likewise, the Y-axis motor controller 1024 calculates feedback control using the DSP provided therein based on the rotation angle of the Y-axis mirror 1008 detected by the Y-axis detector 1012 to control driving of the Y-axis motor 1004.

Upon processing the object OB, the laser beam LL emitted from the light source 1016 is reflected by the Y-axis mirror 1008 and the X-axis mirror 1006 and is illuminated on the object OB. The laser beam LL scans the object OB in the X-axis direction (positive side and negative side) by the rotation of the X-axis mirror 1006. The laser beam LL also scans the object OB in the Y-axis direction (positive side and negative side) by the rotation of the Y-axis mirror 1008. At this time, the X-axis mirror 1006 and the Y-axis mirror 1008 are respectively driven by the X-axis motor 1002 and the Y-axis motor 1004 to realize high-speed and highly-accurate positioning.

For the laser processing apparatus 1000, laser machining at the exact location of the object OB is required and a decrease in cost is preferred. Accordingly, the driving apparatus described in the above embodiments is applied to the laser processing apparatus 1000, which may contribute a decrease in cost of the entire apparatus while maintaining the reproducibility of detection of a reference position without a decrease in the processing accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-000767 filed on Jan. 7, 2014, which is hereby incorporated by reference herein in its entirety.

What is claimed is:

1. A driving apparatus for driving an object, the apparatus comprising:
a driving device configured to displace the object;
a detector configured to detect a displacement amount of the object by the driving device; and
a controller configured to control the driving device based on an output of the detector,
wherein the controller is configured to obtain a thrust characteristic of the driving device with respect to the displacement amount and to set a reference position with respect to the displacement amount detected by the detector based on the obtained thrust characteristic.

2. The apparatus according to claim 1, wherein the thrust characteristic includes a thrust constant or a value proportional thereto.

3. The apparatus according to claim 1, wherein the driving device includes a motor.

4. The apparatus according to claim 1, wherein the detector includes at least one of an incremental encoder and an electrostatic capacitance sensor.

5. An article processing apparatus including a driving apparatus, defined in claim 1, for driving an object included in the article processing apparatus.

6. A driving apparatus for driving an object, the apparatus comprising:
a driving device configured to displace the object;
a detector configured to detect a displacement amount of the object by the driving device; and
a controller configured to control the driving device based on an output of the detector,
wherein the controller is configured to obtain a thrust characteristic of the driving device with respect to the displacement amount based on an acceleration or angular acceleration of the object and a driving current for the driving device and to set a reference with respect to the displacement amount based on the obtained thrust characteristic.

7. A driving apparatus for driving an object, the apparatus comprising:
a driving device configured to displace the object;
a detector configured to detect a displacement amount of the object by the driving device; and
a controller configured to control the driving device based on an output of the detector,
wherein the controller is configured to obtain a thrust characteristic of the driving device with respect to the displacement amount and to set a reference with respect to the displacement amount based on the obtained thrust characteristic such that a relationship between the displacement amount and the thrust characteristic satisfies a predetermined condition.

8. The apparatus according to claim 7, wherein the controller is configured to set the reference such that a degree of correlation between the relationship and a predetermined relationship satisfies a predetermined condition.

9. The apparatus according to claim 8, wherein the degree of correlation between the relationships includes at least one of a sum of squares of each error between the relationships and a coefficient of correlation between the relationships.

10. A driving apparatus for driving an object, the apparatus comprising:
a driving device configured to displace the object;

a detector configured to detect a displacement amount of the object by the driving device; and a controller configured to control the driving device based on an output of the detector, wherein the controller is configured to obtain a thrust characteristic of the driving device with respect to the displacement amount and to set a reference with respect to the displacement amount based on the obtained thrust characteristic, wherein the reference is set such that a relationship between the displacement amount and the thrust characteristic satisfies a predetermined condition and the thrust characteristic has an extremum at the reference by the controller.

* * * * *